(12) United States Patent
Houser et al.

(10) Patent No.: US 11,548,360 B2
(45) Date of Patent: Jan. 10, 2023

(54) ELECTRIC AXLE ASSEMBLY

(71) Applicant: Dana Heavy Vehicle Systems Group, LLC, Maumee, OH (US)

(72) Inventors: Jordan M. Houser, Sylvania, OH (US); Darren J. Ziskovsky, Bowling Green, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/662,823

(22) Filed: May 10, 2022

(65) Prior Publication Data
US 2022/0266670 A1    Aug. 25, 2022

Related U.S. Application Data

(62) Division of application No. 16/926,001, filed on Jul. 10, 2020, now Pat. No. 11,413,948.

(60) Provisional application No. 62/874,046, filed on Jul. 15, 2019.

(51) Int. Cl.
| | |
|---|---|
| *B60K 1/02* | (2006.01) |
| *F16H 63/32* | (2006.01) |
| *F16H 63/30* | (2006.01) |
| *B60K 1/00* | (2006.01) |

(52) U.S. Cl.
CPC .............. *B60K 1/02* (2013.01); *F16H 63/304* (2013.01); *F16H 63/32* (2013.01); *B60K 2001/001* (2013.01)

(58) Field of Classification Search
CPC .... B60K 1/02; B60K 2001/001; B60K 17/02; F16H 63/304; F16H 63/32; B60Y 2400/421; B60Y 2400/424
See application file for complete search history.

(56) References Cited

U.S. PATENT DOCUMENTS

| | | | |
|---|---|---|---|
| 7,846,051 B2 | 12/2010 | Holmes et al. | |
| 8,152,669 B2 | 4/2012 | Maguire et al. | |
| 8,251,166 B2 | 8/2012 | Holmes et al. | |
| 8,734,281 B2* | 5/2014 | Ai | B60K 6/365 475/5 |
| 9,045,032 B2 | 6/2015 | Fuechtner et al. | |
| 9,140,335 B2 | 9/2015 | Knoblauch | |

(Continued)

*Primary Examiner* — David J Hlavka
(74) *Attorney, Agent, or Firm* — McCoy Russell LLP

(57) ABSTRACT

Methods and systems are provided for an electric axle assembly having dual motors and dual disconnects allowing for selectably disconnecting either one of the motors so that either motor may operate as the primary drive motor. In one example, an electric axle assembly comprises: a first motor in communication with a first shaft; a second motor in communication with a second shaft; a first gear set operably coupled to the first shaft; a second gear set operably coupled to the second shaft; and a clutch assembly selectively coupled to the first gear set and the second gear set and operably coupled to an output shaft, wherein the clutch assembly comprises a shift collar and a shift fork, the clutch assembly having a first configuration, a second configuration, and a third configuration, wherein in the first configuration the first motor and the second motor are coupled to the output shaft, in the second configuration the first motor is coupled to the output shaft, and in the third configuration the second motor is coupled to the output shaft.

11 Claims, 5 Drawing Sheets

(56) References Cited

U.S. PATENT DOCUMENTS

| | | |
|---|---|---|
| 9,566,852 B2 | 2/2017 | Knoblauch et al. |
| 11,092,220 B1 * | 8/2021 | Mancini ................. B60K 17/08 |
| 2005/0067199 A1 | 3/2005 | Shimizu |
| 2010/0025131 A1 | 2/2010 | Gloceri et al. |
| 2015/0128762 A1 | 5/2015 | DeFrank et al. |
| 2020/0324647 A1 | 10/2020 | Cook et al. |

* cited by examiner

ELECTRIC AXLE ASSEMBLY

CROSS-REFERENCE TO RELATED APPLICATIONS

The present application is a divisional of U.S. Non-Provisional patent application Ser. No. 16/926,001, entitled "ELECTRIC AXLE ASSEMBLY", and filed on Jul. 10, 2020. U.S. Non-Provisional patent application Ser. No. 16/926,001 claims priority to U.S. Provisional Application No. 62/874,046, entitled "ELECTRIC AXLE ASSEMBLY," and filed on Jul. 15, 2019, the entire contents of which is hereby incorporated by reference for all purposes.

FIELD

The present description relates to electric assemblies having dual electric motor generators.

BACKGROUND AND SUMMARY

Electric vehicles (EVs) typically use an electric motor as its primary drive motor or source of propulsion. The electric motor converts electrical energy, with electrical power expressed in kilowatts (kW), into power to rotate the vehicle wheels. In some examples, the electric motor may also operate as a generator to convert rotation of the wheels into electrical energy. Thus, as is well understood, the electric motor may sometimes be referred to as an electric motor, or a power supply, or an electric generator, or an electric motor generator. The electric motor may be of different types, with AC motors being the most common. Vehicle batteries store the electricity required to run the EV, with the capacity (range) of the batteries usually expressed in kWh (kilowatt-hours). An inverter converts electric direct current (DC) from the batteries into alternating current (AC) used by the AC motor to spin a rotor of the motor, the rotor linked to other parts of the vehicle drivetrain to send power to the wheels. EVs may use a single-speed transmission or a single-speed gear set to supply power to the wheels, usually through a differential interconnected with half-shafts, or other axle components extending to each wheel. However, other EV designs incorporate a multi-speed transmission in order to improve operating characteristics at various vehicle speeds and conditions. Still other EV designs may incorporate more than one electric motor.

For example, dual electric motors may be used. In some applications using dual electric motors, one motor may be optimized for power and the other may be optimized for range. Dual motors may, for example, be used for redundancy, so that the vehicle may operate if one of the motors become inoperative or damaged. When an electric vehicle includes two electric motor generators it is typical that one of the electric motor generators acts as a primary source of propulsion. Having one electric motor generator act as the primary source of propulsion causes the primary electric motor generator to wear more quickly than the second electric motor generator. It would be desirable, therefore, to be able to select which electric motor generator acts as the primary source of propulsion in order to distribute wear to evenly to the electric motor generators in an electric axle.

To address at least some of the aforementioned and other problems, embodiments for an electric axle assembly are provided. According to a first aspect of the disclosure is an assembly comprising: a first motor in communication with a first shaft; a second motor in communication with a second shaft; a first gear set operably coupled to the first shaft; a second gear set operably coupled to the second shaft; and a clutch assembly selectively coupled to the first gear set and the second gear set and operably coupled to an output shaft, wherein the clutch assembly comprises a shift collar and a shift fork, the clutch assembly having a first configuration, a second configuration, and a third configuration, wherein in the first configuration the first motor and the second motor are coupled to the output shaft, in the second configuration the first motor is coupled to the output shaft, and in the third configuration the second motor is coupled to the output shaft.

In one embodiment of the present disclosure, a method comprises: responsive to a request for single motor operation, adjusting a position of a shift fork of a clutch assembly of an assembly, the position of the shift fork adjusted based on an amount of wear on a first electric motor of the assembly and an amount of wear on a second electric motor of the assembly.

In another embodiment of the present disclosure, a system comprises: an electric axle assembly of a vehicle including a first electric motor, a second electric motor, and a clutch assembly, each of the first electric motor and the second electric motor selectably coupled to the clutch assembly; an output shaft rotatably coupled to the clutch assembly; a controller including instructions stored in non-transitory memory that, when executed, cause the controller to: engage one or both of the first electric motor and the second electric motor based on a torque request and an amount of wear on each of the first motor and the second motor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Similar reference numerals are used in different figures to denote similar components.

DETAILED DESCRIPTION

Figure 1:
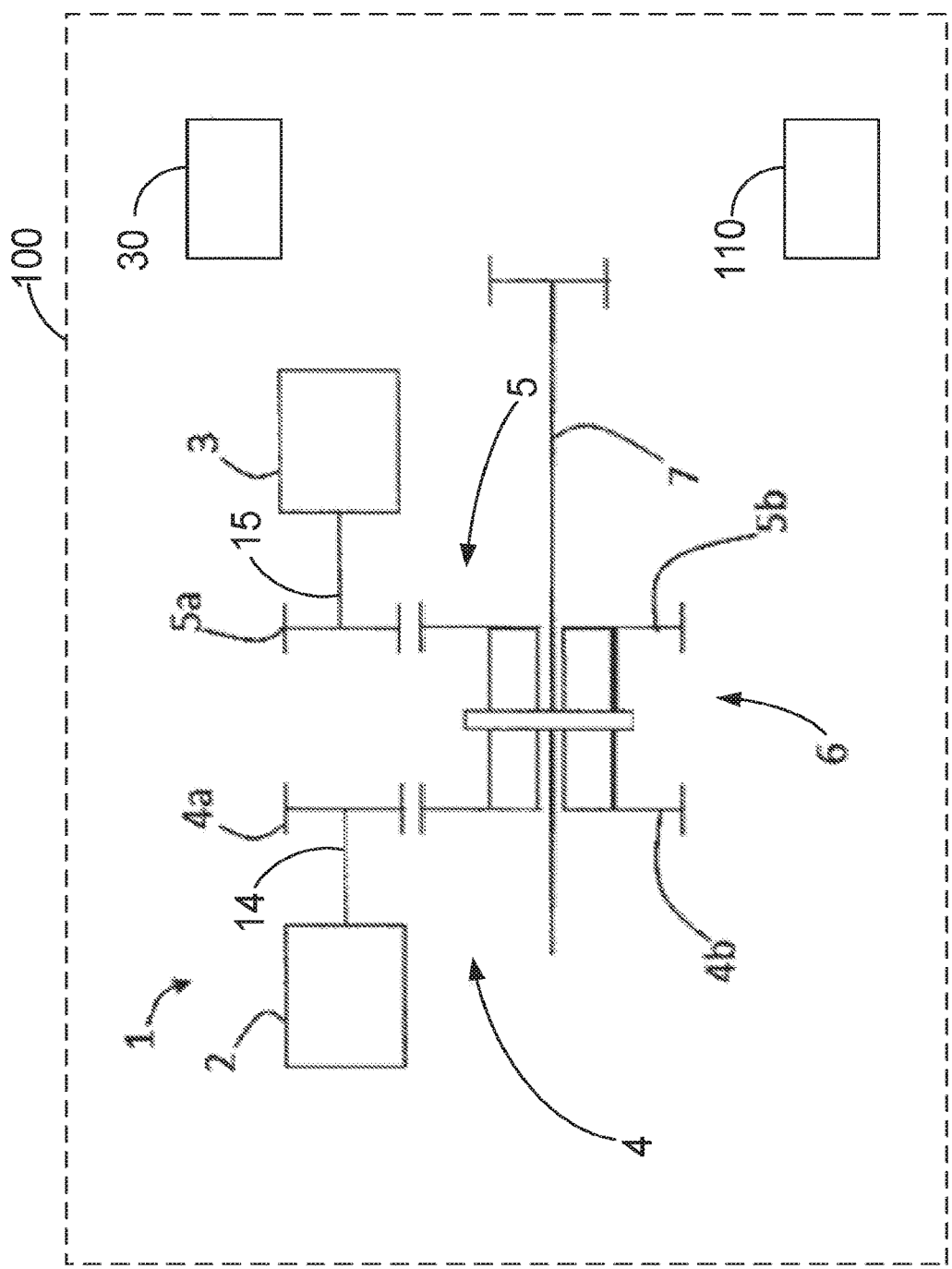
FIG. 1 is a schematic view of a vehicle including an electric axle assembly in according with an embodiment of the present disclosure.
Figure 2:
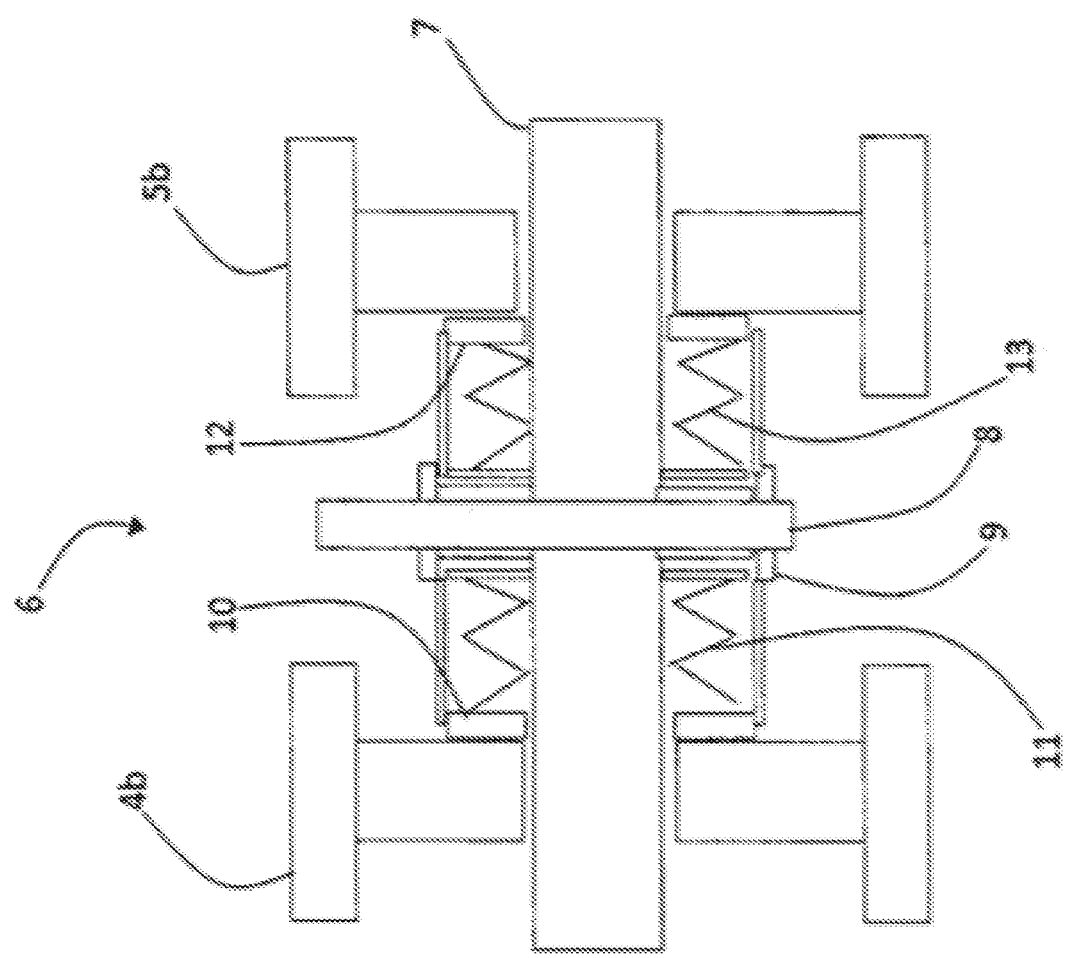
FIG. 2 is a schematic view of an electric axle assembly in accordance with another embodiment.

The following description relates to systems and methods for operating an assembly including dual electric motors. For example, a vehicle may be an electric vehicle (EV) with an electric axle assembly for providing motive power to wheels of the EV. Further, at least two electric motors may be included in an electric axle in order to increase axle efficiency, as shown in FIG. 1. Further, the electric axle may be in a first axle configuration, as shown in FIG. 2, in which both of the two electric motors are engaged. Further still, the electric axle may be in a second axle configuration, shown in FIG. 3, in which a first electric motor is engaged, while a second electric motor is not engaged. As shown in FIG. 4, the electric axle may be in a third axle configuration in which the second electric motor is engaged, while the first electric motor is not engaged. For example, the electric axle may transition between the first axle configuration, the second axle configuration, and the third axle configuration based on operating conditions, according to the method shown in FIG. 5. It is to be understood that the present disclosure may assume various alternative orientations and step sequences, except where expressly specified to the contrary. It is also to be understood that the assemblies, devices, and methods illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise.

Generally, the inventors herein have realized that the described dual electric motor disconnect embodiments may improve drive axle/electric axle assembly/system efficiency, motor and gear train/system cooling, and motor life optimization. More specifically, system efficiency at highway speeds prompted the present inventors to develop various improvements such as the embodiments described herein, which provide for disconnecting either one of two motors, in a compact layout (e.g., taking less space with shafts in parallel and gears closely packed), higher performance (e.g., two speed transmission and dual motors), and weight reduction (due to compact layout/size) of the electric axle assembly. The embodiments described herein for an electric axle assembly having dual motors, allow for driving with one primary motor and allow the motor/vehicle controller to switch between primary motors to allow each motor to achieve the same theoretical wear instead of having one motor operating at near full capacity, for example, 80% of the time.

A vehicle 100 including an electric axle assembly 1 is illustrated in FIG. 1. The electric axle assembly 1 may be utilized as an electric drive axle or as a primary drive transition in vehicle 100 (e.g., a motor vehicle). As such, vehicle 100 is an EV. The electric axle assembly 1 may have applications in commercial vehicles, both light duty and heavy duty vehicles, and for passenger, off-highway, and sport utility vehicles. Additionally, the electric axle assembly 1 may be adapted for user in front and/or rear driving axles, and steerable and non-steerable axles. It would be understood by one of ordinary skill in the art that the electric axle assembly 1 may also have industrial, locomotive, military, agricultural, and aerospace applications. For example, in addition to the electric axle assembly 1, vehicle 100 may include additional vehicle systems, such as a lubrication system, an engine system, a cooling system, a transmission system, and the like.

In one embodiment, the electric axle 1 is provided with a first motor 2 and a second motor 3. The first motor 2 communicates rotational power with a first shaft 14. In some embodiments, first shaft 14 is a motor shaft, while in other embodiments, the first shaft 14 may be a gear shaft. The first shaft 14 is coupled to a first gear reduction 4. As shown in FIG. 1, the first gear reduction 4 comprises a first gear 4a and a second gear 4b. The first gear 4a is in meshing engagement with the second gear 4b.

In one embodiment, the second motor 3 communicates rotational power through a second shaft 15. In some embodiments, the second shaft 15 is a motor shaft, while in other embodiments, second shaft 15 is a gear shaft. Further, the second shaft 15 is coupled to a second gear reduction 5. In some embodiments, the second gear reduction 5 comprises a third gear 5a and a fourth gear 5b. The third gear 5a is in meshing engagement with the fourth gear 5b.

Each of the first motor 2 and the second motor 3 may be powered by a battery 30 of vehicle 100. For example, battery 30 may provide electrical power to each of the first motor 2 and the second motor 3. Battery 30 may be electrically coupled to each of the first motor 2 and the second motor 3, such as via power cables. Each motor may be an AC motor or a DC motor, and may convert electrical power to rotational energy. Further, in some examples, one or both of the first motor 2 and the second motor 3 may operate as generators in order to convert rotational energy from the wheels of the vehicle into electrical power stored in the battery 30. In some examples, battery 30 is a single battery, while in other examples, battery 30 comprises a plurality of batteries.

In one embodiment, the first gear reduction 4 and the second gear reduction 5 may be operably coupled to a clutch assembly 6. More particularly, each of the second gear 4b and the fourth gear 5b may be operably coupled to the clutch assembly 6. In certain embodiments, an output shaft 7 is disposed through the clutch assembly 6. In these embodiments, the output shaft 7 may extend beyond a first end of the clutch assembly and a second end of the clutch assembly. In some embodiments, the clutch assembly 6 is disposed around a portion of the output shaft 7. In one embodiment, the clutch assembly 6 is coupled to the output shaft 7. As such, rotational power may be provided to output shaft 7. For example, output shaft 7 may drive a component of the vehicle, such as wheels of the engine. In particular, output shaft 7 may transmit rotational power from electric axle assembly 1 to wheels of vehicle 100, in order to provide motive force to vehicle 100. As another example, output shaft 7 may be used to charge a battery of the vehicle 100 (not shown in FIG. 1).

Further, as shown in FIG. 1, the vehicle 100 includes a controller 110 communicatively coupled to components of electric axle assembly 1. The controller 110 may be configured to control various components related to the motor vehicle. For example, controller 110 may be a microcomputer, including a microprocessor unit, input/output ports, an electronic storage medium for executable programs (e.g., executable instructions) and calibration values stored in non-transitory read-only memory. As an example, various components of the vehicle system may be coupled to the controller 110 via a communication channel or data bus. In one example, the controller 110 includes a computer control system. Controller 110 may receive various signals from sensors of the vehicle system. In some examples, the controller 110 may include more than one controller each in communication with one another, such as a first controller to control the electric axle assembly and a second controller to control other operating parameters of the vehicle (such as gearing, brake torque, etc.). The first controller may be configured to control various actuators based on output received from the second controller and/or the second controller may be configured to control various actuators based on output received from the first controller.

The controller 110 may receive information from a plurality of sensors and may send control signals to a plurality of actuators. The controller 110, while overseeing control and management of the engine and/or vehicle, may be configured to receive signals from a variety of sensors, as further elaborated herein, in order to determine operating parameters and operating conditions, and correspondingly adjust various actuators to control operation of the engine and/or vehicle. For example, the controller 110 may receive signals from various engine sensors including, but not limited to, measurements of vehicle grade, engine load, accelerator pedal input, operating temperature, torque demand, or the like. Additional sensors, such as coolant temperature sensors, may be positioned in the cooling system. Correspondingly, the controller 110 may control the engine and/or the vehicle by sending commands to various components. For example, the controller 110 may control the operation of the electric axle assembly, such as by adjusting a configuration of the electric axle assembly between single motor operation (e.g., operating with one of the motors) and dual motor operation (e.g., operating with both of the motors). Other actuators may be coupled to various locations in the vehicle.

Further, in some examples, the methods and systems described herein may be applied to electric transmissions. For example, an electric transmission may include two electric motors, gears, and clutches. The electric transmission may be mounted centrally between frame rails, and be coupled to a propeller shaft connected to a standard axle (e.g., an axle that is not electrified). For example, an electric transmission may include a clutch assembly, such as clutch assembly 6 shown in FIG. 1, and may include a first electric motor and a second electric motor. The clutch assembly may be adjusted in order to transition the electric transmission between single motor operation and dual motor operation. Further, during single motor operation, a motor may be selected based on motor wear. For example, the methods and systems described herein may be used interchangeably for an electric axle assembly and an electric transmission assembly.

Figure 3:
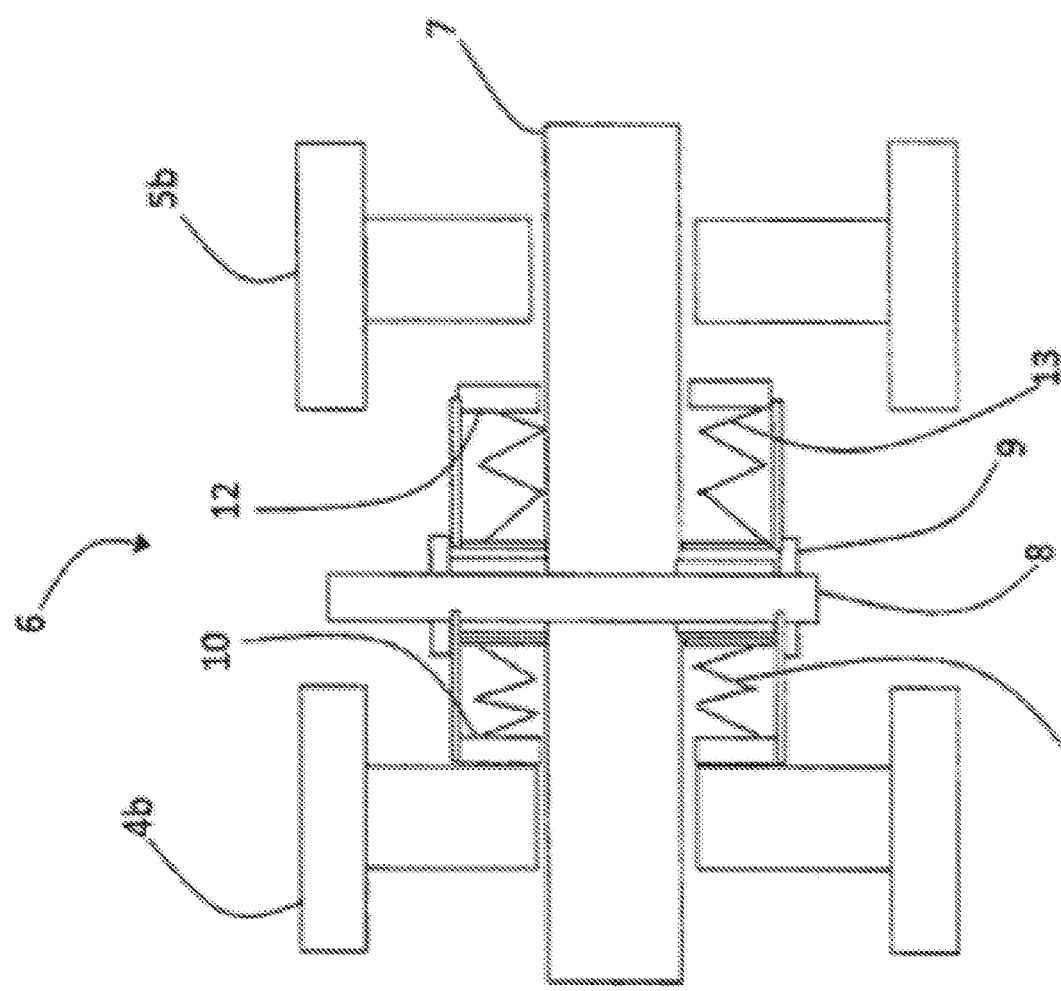
FIG. 3 is a schematic view of an electric axle assembly in accordance with another embodiment.
Figure 4:
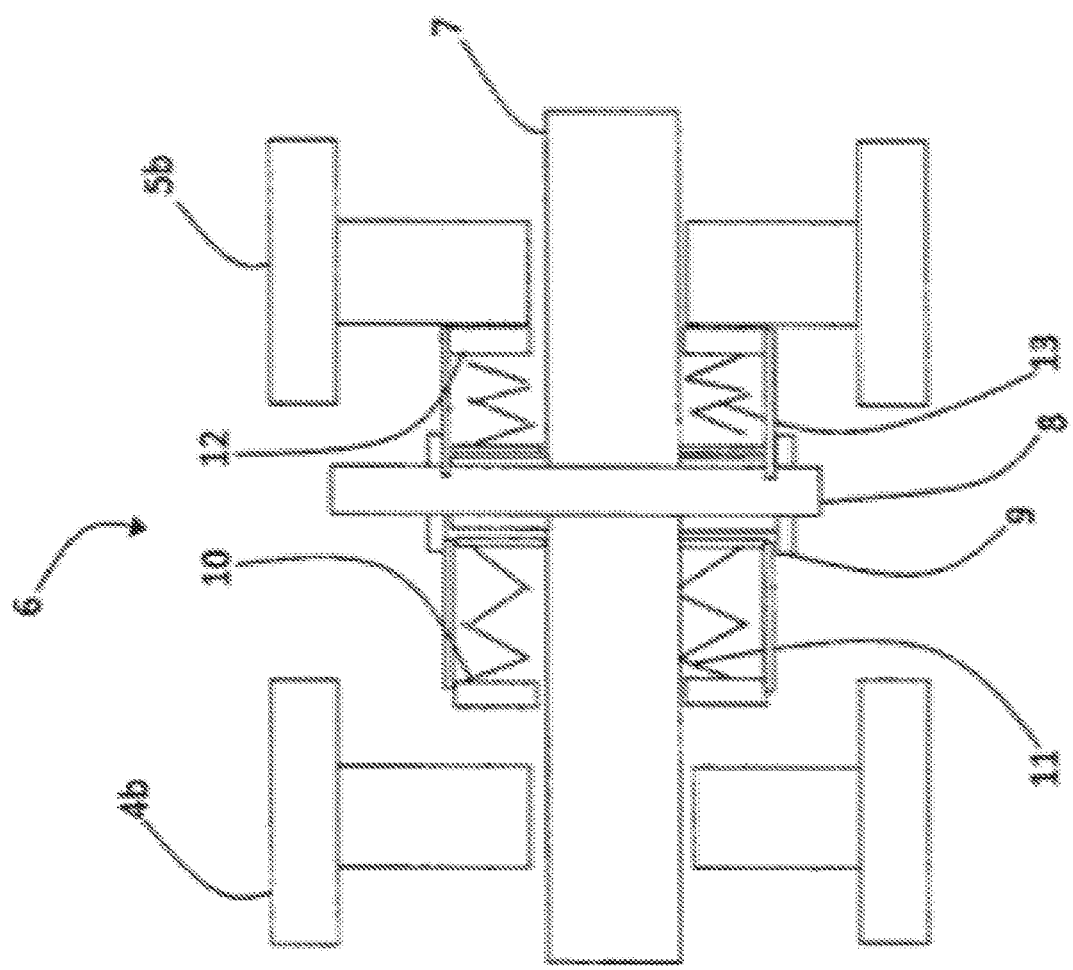
FIG. 4 is a schematic view of an electric axle assembly in accordance with another embodiment.

Next, FIG. 2-4 show isolated views of the clutch assembly 6, including the second gear 4b, the fourth gear 5b, and the output shaft 7. As an example, clutch assembly 6 may be included in an electric axle, as shown in FIG. 1. Like components may be numbered the same and not reintroduced. As another example, clutch assembly 6 may be included in an electric transmission. Further, each of FIG. 2, FIG. 3, and FIG. 4 show the clutch assembly 6 in different configurations. In FIG. 2, the clutch assembly 6 is in a first configuration, in which both of the first motor 2 and the second motor 3 provide rotational power to the clutch assembly 6, which transmits the power to the output shaft 7. Because both of the first motor 2 and the second motor 3 provide rotational power to output shaft 7, the electric axle assembly may operate with dual motor operation when the clutch assembly is in the first configuration. For example, as illustrated in FIG. 2, when the clutch assembly 6 is in a first motor configuration, the second gear 4b of the first gear reduction 4 and the fourth gear 5b of the second gear reduction 5 are coupled to the clutch assembly 6. In this embodiment, rotational power generated by the first motor 2 and the second motor 3 is communicated to the clutch assembly 6 via the second gear 4b of the first gear reduction 4 and the fourth gear 5b of the second gear reduction 5.

Further, the clutch assembly 6 includes a shift fork 8 and a shift collar 9 operably coupled to the output shaft 7. In some embodiments, the shift fork 8 is coupled to a grounded member (not depicted) of the electric axle 1 and is controllable by a controller (e.g., controller 110 of FIG. 1). For example, shift fork 8 may be controlled in order to adjust which of the second gear 4b and the fourth gear 5b communicate rotational power to output shaft 7. For example, changing a position of shift fork 8 may transition the clutch assembly 6 between the first configuration (e.g., shown in FIG. 2), a second configuration (e.g., shown in FIG. 3), and a third configuration (e.g., shown in FIG. 4). As an example, the position of shift fork 8 may be adjusted via a signal from controller 110 of FIG. 1.

In some embodiments, the shift collar 9 is attached to the output shaft 7 and is configured to provide a coupling between the rotatable output shaft 7 and the non-rotatable shift fork 8. In one such embodiment, an inner diameter of the shift collar 9 is attached to an outer diameter of the output shaft 7. In another embodiment, the shift collar 9 is coupled to the output shaft 7 through a splined interface between the inner diameter of the shift collar 9 and the outer diameter of the output shaft 7.

In one embodiment, the clutch assembly 6 has a first clutch element 10 coupled by a first spring 11 to the shift collar 9. In an embodiment, the first spring 11 extends in an axial direction from the shift collar 9 toward the first clutch element 10. In some embodiments, the first clutch element 10 is engaged on an end thereof to the second gear 4b of the first gear reduction 4. The first clutch element 10 may be engaged to the second gear 4b by any clutching interface known in the art. In one embodiment, the first clutch element 10 engages the second gear 4b through a friction interface. In another embodiment, the first clutch element 10 engages the second gear 4b through a set of locking dog teeth.

In one embodiment, the clutch assembly 6 has a second clutch element 12 coupled by a second spring 13 to the shift collar 9. In an embodiment, the first spring 11 is disposed on a first side of the shift collar 9 and the second spring 13 is disposed on a second side of the shift collar 9. In an embodiment, the second spring 13 extends in an axial direction from the shift collar 9 toward the second clutch element 12. In some embodiments, the second clutch element 12 is engaged on an end thereof to the fourth gear 5b of the second gear reduction 5. The second clutch element 12 may be engaged to the fourth gear 5b by way of clutching interfaces known in the art. In one embodiment, the second clutch element 12 engages the fourth gear 5b through a friction interface. In another embodiment, the second clutch element 12 engages the fourth gear 5b through a set of locking dog teeth.

During operation of the electric axle 1, the shift fork 8 positions the shift collar 9 axially on the output shaft 7. In a first position of the shift fork 8, the first clutch element 10 is engaged to the first gear 4a and the second clutch element 12 is engaged to the fourth gear 5b. In the first position of the shift fork 8, the shift collar 9 may be located at an equal distance to the second gear 4b of the first gear reduction 4 and the fourth gear 5b of the second gear reduction 5. In the first position of the shift fork 8, the first spring 11 provides a force that couples the first clutch element 10 and the first gear 4a. In the first position of the shift fork 8, the second spring 13 provides a force that couples the second clutch element 12 to the fourth gear 5b. In the first position, rotational power generated by the first motor 2 and the second motor generator 3 is transmitted to the output shaft 7 by way of the first and second gear reductions 4, 5 and the clutch assembly 6. Stated differently, when the shift fork 8 is in the first position, the clutch assembly 6 is in the first configuration (e.g., dual motor operation).

Further, in order to transmit rotational power to the output shaft 7 via only one of motor 2 and motor 3, the shift fork 8 may be utilized to disengage one of clutch element 10 and clutch element 12 from a gear (e.g., one of second gear 4b and fourth gear 5b). For example, when one of the motors is disengaged, and the other motor is engaged the electric axle assembly may operate with single motor operation. Two examples of single motor operation are shown in FIG. 3 and FIG. 4. For example, with reference to FIG. 3, the shift fork 8 is in a second position, and may be utilized to disengage the second clutch element 12 from the fourth gear 5*b* of the second gear reduction 5 so that rotational power is transmitted to the output shaft 7 via the first motor 2, and not via the second motor 3 (e.g., the second configuration). In this embodiment, the shift fork 8 may axially position the shift collar 9 on the output shaft 7 in a second position. In the second position of the shift fork 8, the first clutch element 10 is coupled to the second gear 4*b* of the first gear reduction 4 and the second clutch element 12 is decoupled from the fourth gear 5*b* of the second gear reduction 5. In the second position of the shift fork 8, the first spring 11 provides a force to couple the first clutch element 10 to the first gear 4*a*. In the second position of the shift fork 8, the shift collar 9 may be located closer to the second gear 4*b* o the first gear reduction 4 than the fourth gear 5*b* of the second gear reduction 5. In the second position of the shift fork 8, rotational power is transmitted from the first motor 2 to the output shaft 7 by way of the first gear reduction 4 and the clutch assembly 6, while rotational power is not transmitted from the first motor 3 to the output shaft 7. For example, when the shift fork 8 is in the second position, the electric axle assembly 1 is in the second configuration. For example, when the electric axle assembly 1 is in the second configuration, the second motor 3 may be deactivated.

Turning now to FIG. 4, the clutch assembly 6 is shown in the third configuration, in which the shift fork 8 axially positions the shift collar 9 on the output shaft 7 in a third position. In this embodiment, the shift fork 8 may be utilized to disengage the first clutch element 10 from the second gear 4*b* of the first gear reduction 4 so that rotational power is transmitted from the output shaft 7 via the second motor 3. In the third position of the shift fork 8, the second clutch element 12 is coupled to the fourth gear 5*b* of the second gear reduction 5 and the first clutch element 10 is decoupled from the second gear 4*b* of the first gear reduction 4. In the third position of the shift fork 8, the second spring 13 provides a force to couple the second clutch element 12 to the fourth gear 5*b*. In the third position of the shift fork 8, the shift collar 9 may be located closer to the fourth gear 5*b* of the second gear reduction 5 than the second gear 4*b* of the first gear reduction 4. In the third position of the shift fork 8, rotational power is transmitted from the second motor 3 of the output shaft 7 by way of the second gear reduction 5 and the clutch assembly 6. As such, when the shift fork 8 is in the third position (e.g., the electric axle assembly 1 is in the third configuration), the first motor 2 does not provide rotational power to the output shaft 7, while the second motor 3 does provide rotational power to the output shaft 7.

In some embodiments, the shift fork 8 is provided with a locking mechanism (not shown) that provides an additional holding force to the shift collar 9.

In an embodiment, the clutch assembly shown in FIGS. 2-4 is included in an electric transmission assembly, and may transition between operating the electric transmission assembly with dual motor operation and single motor operation.

Figure 5:
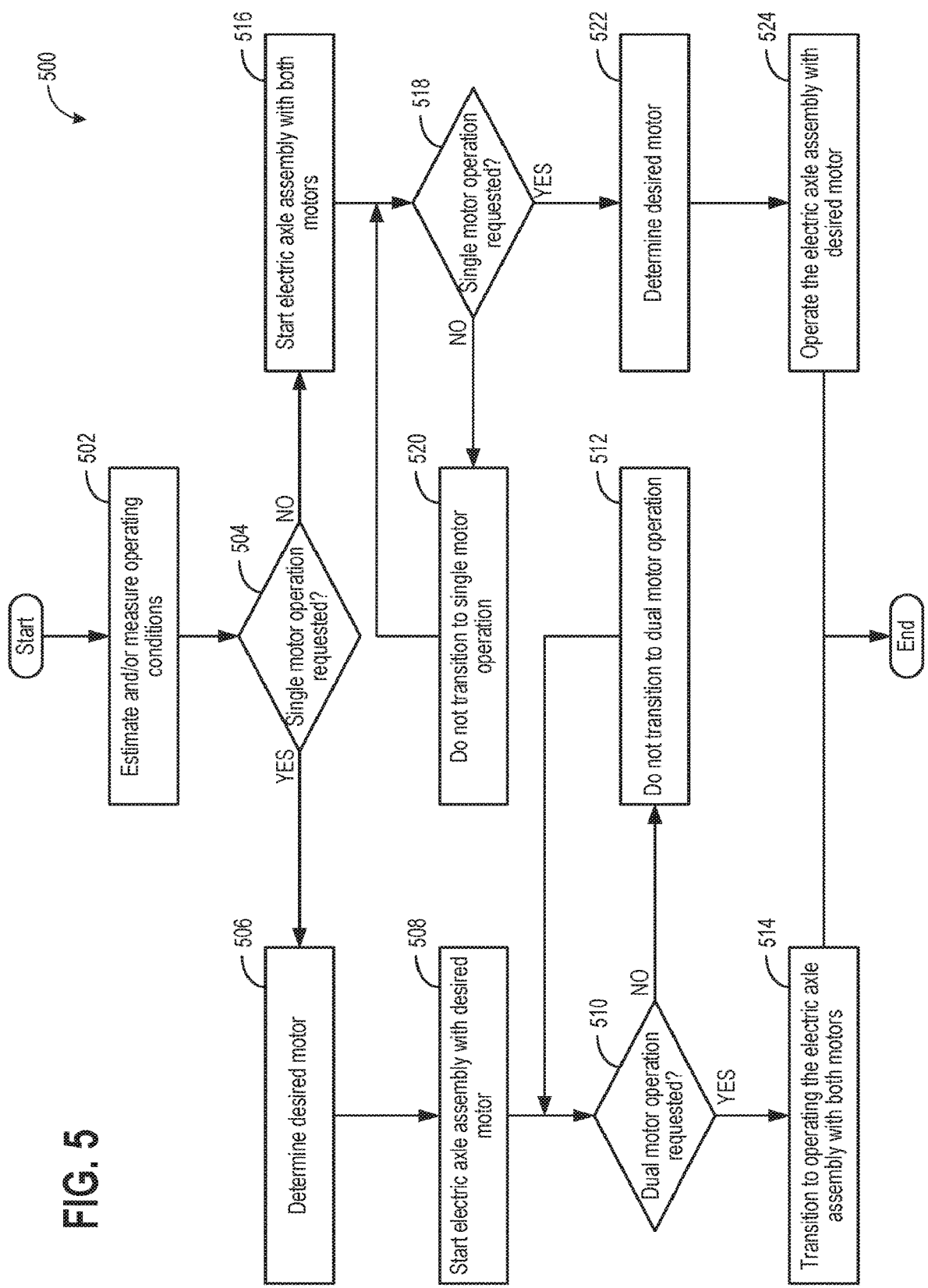
FIG. 5 is an example method for operating an electric axle assembly according to an embodiment of the present disclosure.

Next, FIG. 5 shows an example method 500 for controlling an electric axle assembly (e.g., electric axle assembly 1 of FIG. 1) in order to transition between the first configuration (e.g., as shown in FIG. 2), the second configuration (e.g., as shown in FIG. 3), and the third configuration (e.g., as shown in FIG. 4). Method 500 is described with respect to an electric axle assembly, but may also be applied to an electric transmission assembly including a first motor and a second motor. The electric axle assembly may include a first motor and a second motor, and may further include a clutch assembly for engaging one or both of the motors. For example, based on operating conditions, the electric axle assembly operate in one of a dual motor operation, such as shown in FIG. 2, and a single motor operation, such as shown in FIGS. 3 and 4. Further, during vehicle operation, the electric axle assembly may be transitioned between dual motor operation and single motor operation based on operating conditions such as a load determination. Method 500 is described with respect to the vehicle 100 shown in FIG. 1 and the electric axle assembly 1 shown in FIG. 1, including the clutch assembly 6 shown in FIGS. 1-4, although method 500 may be applied to other systems in include an electric axle assembly with at least two motors. Instructions for carrying out method 500 and the rest of the methods included herein may be executed by a controller based on instructions stored on a memory of the controller and in conjunction with signals received from sensors of the vehicle system, such as a torque demand of a motor and a vehicle load to adjust operation according to the methods described below.

At 502, method 500 includes estimating and/or measuring vehicle operating conditions. For example, at 502, method 500 may determine an amount of torque requested upon starting the vehicle. The amount of torque requested may be the amount of load output from the motors requested to operate the vehicle. The amount of load may vary based on a driver-demanded torque, a road grade (e.g., a grade of a road the vehicle may drive on), a vehicle weight, any additional load placed on the vehicle (e.g., such as cargo), and an acceleration request. For example, in order to determine that amount of torque requested, the controller may input the driver-demanded torque, the road grade, the vehicle weight, vehicle loading (e.g., by cargo and other loads), and the requested acceleration into one or more look-up tables, maps, or functions, which may output an amount of torque requested. The controller may determine each of the inputs based on one or more sensors, such as a pedal position sensor coupled to an acceleration pedal, a grade sensor, and a vehicle load (e.g., added weight) sensor.

At 504, method 500 includes determining whether single motor operation is requested. In particular, the controller may determine whether single motor operation is requested based on the amount of torque requested. For example, the controller may determine that single motor operation is requested when the amount of torque requested is below a threshold amount of toruqe. Further, if the amount of torque requested is above the threshold amount of torque, the controller may determine that single motor operation is not requested (e.g., dual motor operation is requested). The threshold amount of torque may be a pre-determined value corresponding to amount of load below which single motor operation may be preferred to dual motor operation. Further, the threshold amount of torque may correspond to an amount of load above which dual motor operation is preferred. For example, above the threshold amount of torque, single motor operation may not provide a sufficient amount of load, or may increase an incidence of component degradation. In some examples, the threshold amount of torque may be adjusted based on other engine operation conditions, such as operating temperature and road conditions. As an example, the amount of load requested may be below the threshold amount of torque when the vehicle is starting downhill, when the vehicle is unloaded, and when low acceleration is requested. As another example, the amount of torque requested may be above the threshold amount of torque when the vehicle is starting uphill, fully loaded, or when high acceleration is requested.

If the controller determines that single motor operation is requested at 504, method 500 continues to 506, and includes determining a desired motor for starting the vehicle. For example, if the controller determines that single motor operation is requested at 504, one of the two motors (e.g., the first motor and the second motor) may be selected to provide rotational power to an output shaft of the electric axle assembly. In order to determine the desired motor for starting the vehicle, the controller may determine which of the first motor and the second motor to engage based on an amount of wear for each of the two motor. Each motor may have associated usage data, an amount of wear based on an amount of time spent at high temperature, an amount of time at high load, and a total number of motor cycles (e.g., revolutions). For example, the controller may input the motor usage data into one or more look-up tables, maps, or functions, which may output which of the first motor and the second motor has less wear, and the controller may select the motor with less wear as the desired motor for starting the vehicle.

At 508, method 500 includes starting the vehicle with the desired motor. For example, a shift fork of a clutch assembly of the electric axle assembly (e.g., shift fork 8) may be adjusted so that the desired motor is engaged, and the other motor (e.g., the undesired motor) is not engaged. In particular, the clutch assembly may be in the second configuration (e.g., shown in FIG. 3) if the first motor is selected, and in the third configuration (e.g., shown in FIG. 4) if the second motor is selected. The shift fork may be adjusted to a second position for the second configuration, or may be adjusted to a third position for the third configuration. Further, the controller may cause the desired motor to rotate, so that rotational power is transmitted to an output shaft of the electric axle assembly. As an example, the controller may increase an amount of electrical power from a battery (e.g., battery 30 of FIG. 1) provided to the desired motor, which may cause the motor to rotate. Further, transmitting rotational power to the output shaft of the electric axle assembly may cause the vehicle to begin moving.

At 510, method 500 includes determining whether dual motor operation is requested. For example, after the vehicle begins operating with single motor operation, the controller may continue to monitor an amount of torque requested, in order to determine whether a transition to dual motor operation is requested based on an amount of torque requested. For example, the amount of torque requested to move the vehicle may increase due to a change in grade, a change in acceleration, and a change in vehicle weight. As such, the controller may determine whether the amount of torque requested exceeds the threshold amount of torque. For example, if the amount of torque requested exceeds the threshold amount of torque requested, the controller may determine that dual motor operation is requested (e.g., single motor operation is no longer requested).

If the controller determines that dual motor operation is not requested at 510 (e.g., single motor operation is still requested), method 500 continues to 512, and includes not transitioning to dual motor operation. For example, the vehicle may continue to operate with single motor operation, so that the desired motor provides rotational force to the vehicle, and the other motor does not. Method 500 may return to 510.

If the controller determines that dual motor operation is requested at 510, method 500 continues to 514 and includes transitioning the electric axle assembly to operate with both motors. For example, in order to transition to dual motor operation from single motor operation, the unused motor (e.g., the motor not activated during single motor operation) may be activated in order to synchronize the speeds of the two motors. Once the second motor speed is synchronized with the first motor speed, the shift fork of the clutch assembly of the electric motor assembly may be adjusted to a first position (e.g., as shown in FIG. 2) so that both of the first motor and the second motor provide rotational force to the output shaft. For example, the shift fork may be adjusted to the first position so that the clutch assembly is in the first configuration, corresponding with dual motor operation. Method 500 may then end.

If the controller determines that single motor operation is not requested at 504 (e.g., dual motor operation is requested), method 500 continues to 516, and includes starting the vehicle with both motors (e.g., with dual motor operation). For example, the clutch assembly may be adjusted so that both of the first motor and the second motor are engaged. For example, the clutch assembly may be configured as shown in FIG. 2, with the shift fork in the first position in order to engage both of the first motor and the second motor. Further, the controller may cause both of the first motor and the second motor to begin rotating at the same rotational speed in order to provide rotational power to the output shaft. As an example, the controller may adjust an amount of electrical power provided to each of the first motor and the second motor, so that the electrical current causes the motors to rotate. For example, rotational power from the motors may be transmitted to the wheels of the vehicle via the output shaft, so that the vehicle begins moving.

At 518, method 500 includes determining whether single motor operation is requested. For example, after the vehicle begins operating with dual motor operation, the controller may determine that a transition to single motor operation is requested based on an amount of torque requested. For example, the amount of torque requested to move the vehicle may decrease due to a change in grade, a change in acceleration, and a change in vehicle weight. As an example, the amount of load may decrease when the vehicle reaches a certain vehicle speed (e.g., such as a highway speed). As such, the controller may determine whether the amount of torque requested is below the threshold amount of torque. For example, if the amount of torque requested is below the threshold amount of torque requested, the controller may determine that single motor operation is requested (e.g., single motor operation is requested). For example, when the amount of toque requested is low, dual motor operation may decrease vehicle efficiency, while single motor operation may increase vehicle efficiency.

If the controller determines that single motor operation is not requested at 518, method 500 continues to 520 and includes not transitioning to single motor operation. For example, the clutch assembly may continue to engage both motors, both motors may continue to rotate, and the electric axle assembly may continue to operate with dual motor operation. Method 500 may return to 518.

If the controller determines that single motor operation is requested at 522, method 500 continues to 522 and includes determining a desired motor for operating the vehicle. For example, the controller may determine which of the first motor and the second motor has less wear as described at step 506, so that the motor with less wear is selected as the desired motor. In particular, the desired motor may be selected so that each of the first motor and the second motor have a similar amount of engine wear.

At 524, method 500 includes operating the electric axle assembly with the desired motor. For example, the shift fork of the clutch assembly may be adjusted to a position where the desired motor is engaged and the other motor is not engaged. For example, if the desired motor is the first motor, the clutch assembly may be in the first configuration, as shown in FIG. 3. As another example, if the desired motor is the second motor, the clutch assembly may be in the second configuration, as shown in FIG. 4. In some examples, in order to disengage one of the motors, the other motor (e.g., the motor not selected) may apply an amount of torque in order to disengage the clutch. Method 500 may then end.

In this way, a vehicle with an electric axle assembly including a first motor and a second motor may be transitioned between dual motor operation (e.g., operation with both of the first motor and the second motor engaged) and single motor operation (e.g., operation with one of the first motor and the second motor engaged) based on a requested amount of torque. For example, based on an amount of torque requested from the electric axle assembly, a clutch assembly of the electric axle assembly may be adjusted between a first configuration (e.g., dual motor operation), a second configuration (e.g., single motor operation with the first motor engaged), and a third configuration (e.g., single motor operation with the second motor engaged). In particular, a position of a shift fork of the clutch assembly may be adjusted in order to engage and disengage the motors. Further, a motor may be selected for single motor operation based on motor wear, which may decrease an incidence of uneven motor wear. For example, by monitoring an amount of motor wear for each of a first motor and a second motor, the controller may determine which of the two motors to engage for single motor operation, so that each motor may be used approximately equally. By evenly distributing motor wear between the first motor and the second motor, an incidence of component degradation and repair costs may be decreased. For example, each of the first motor and the second motor may be used approximately equally across a plurality of use cycles. Further, by enabling the electric axle assembly to transition between single motor operation and dual motor operation, the benefits of dual motor operation may be provided, while efficiency may be increased in low load operating conditions by using single motor operation.

The technical effect of selecting which of a first electric motor and a second electric motor to engage during single motor operation of one of an electric axle assembly and an electric transmission assembly is that uneven motor wear may be decreased.

As an example, an assembly comprises: a first motor in communication with a first shaft; a second motor in communication with a second shaft; a first gear set operably coupled to the first shaft; a second gear set operably coupled to the second shaft; and a clutch assembly selectively coupled to the first gear set and the second gear set and operably coupled to an output shaft, wherein the clutch assembly comprises a shift collar and a shift fork, the clutch assembly having a first configuration, a second configuration, and a third configuration, wherein in the first configuration the first motor and the second motor are coupled to the output shaft, in the second configuration the first motor is coupled to the output shaft, and in the third configuration the second motor is coupled to the output shaft. In the preceding example, additionally or optionally, the output shaft is disposed through the clutch assembly, the output shaft extending beyond a first end of the clutch assembly, and the shift collar is coupled to the output shaft. In one or both of the preceding examples, additionally or optionally, the clutch assembly further comprises: a first spring coupled to the shift collar; and a first clutch element coupled to the first spring, the first clutch element selectively coupled to the first gear set. In any or all of the preceding examples, additionally or optionally, the clutch assembly further comprises a second spring coupled to the shift collar. In any or all of the preceding examples, additionally or optionally, the clutch assembly further comprises a second clutch element coupled to the second spring, the second clutch element selectively coupled to the second gear set. In any or all of the preceding examples, additionally or optionally, the first gear set comprises a first gear coupled to the first shaft and a second gear coupled to the first clutch element. In any or all of the preceding examples, additionally or optionally, the second gear comprises a friction surface adapted to engage the first clutch element. In any or all of the preceding examples, additionally or optionally, the second gear comprises a plurality of dog teeth adapted to engage the first clutch element. In any or all of the preceding examples, additionally or optionally, the second gear set comprises a first gear coupled to the second shaft and a second gear coupled to the second clutch element. In any or all of the preceding examples, additionally or optionally, the second gear comprises a friction surface adapted to engage the second clutch element. In any or all of the preceding examples, additionally or optionally, the shift collar couples to the output shaft through a splined interface between an inner diameter of the shift collar and an outer diameter of the output shaft.

As another example, a method comprises: responsive to a request for single motor operation, adjusting a position of a shift fork of a clutch assembly of an assembly, the position of the shift fork adjusted based on an amount of wear on a first electric motor of the assembly and an amount of wear on a second electric motor of the assembly. In the preceding example, additionally or optionally, the request for single motor operation is responsive to an amount of torque requested below a threshold amount of torque. In one or both of the preceding examples, additionally or optionally, adjusting the position of the shift fork of the clutch assembly of the assembly, the position of the shift fork adjusted based on the amount of wear on the first motor of the assembly and the amount of wear on the second motor of the assembly, includes: responsive to the amount of wear on the first motor less than the amount of wear on the second motor, adjusting the position of the shift fork to a first position, the clutch assembly engaged with the first motor and not engaged with the second motor when the shift fork is in the first position; and responsive to the amount of wear on the second motor less than the amount of wear on the first motor, adjusting the position of the shift fork to a second position, the clutch assembly engaged with the second motor and not engaged with the second motor when the shift fork is in the second position. In one or both of the preceding examples, the method additionally or optionally further comprises: responsive to a request for dual motor operation, adjusting the position of the shift fork to a third position, the clutch assembly engaged with each of the first motor and the second motor in the third position. In any or all of the preceding examples, additionally or optionally, the request for dual motor operation is responsive to the amount of torque requested at or above the threshold amount of torque.

As yet another example, a system comprises: an electric axle assembly of a vehicle including a first electric motor, a second electric motor, and a clutch assembly, each of the first electric motor and the second electric motor selectably coupled to the clutch assembly; an output shaft rotatably coupled to the clutch assembly, the output shaft driving wheels of the vehicle; a controller including instructions stored in non-transitory memory that, when executed, cause the controller to: engage one or both of the first electric motor and the second electric motor based on a torque request and an amount of wear on each of the first electric motor and the second electric motor. In the preceding example, additionally or optionally, to engage each of the first electric motor and the second electric motor based on a torque request and an amount of wear on each of the first electric motor and the second electric motor, the controller includes further instructions stored in non-transitory memory that, when executed, cause the controller to: responsive to the torque request exceeding a threshold torque request, engage both of the first electric motor and the second electric motor via adjusting a configuration of the clutch assembly to a first configuration; and responsive to the torque request below the threshold torque request, engage one of the first electric motor and the second electric motor. In any or all of the preceding examples, additionally or optionally, to engage one of the first electric motor and the second electric motor, the controller includes further instructions stored in non-transitory memory that, when executed, cause the controller to: determine an amount of wear on the first electric motor and an amount of wear on the second electric motor; responsive to the amount of wear on the first electric motor less than the amount of wear on the second electric motor, engage the first electric motor and not the second electric motor via adjusting the configuration of the clutch assembly to a second configuration; and responsive to the amount of wear on the second electric motor less than the amount of wear on the first electric motor, engage the second electric motor and not the first electric motor via adjusting the configuration of the clutch assembly to a third configuration. In any or all of the preceding examples, additionally or optionally, the amount of wear on the first electric motor and the amount of wear on the second electric motor determined is based on at least one of a current operating temperature, a total amount of time at maximum load, and a total number of motor cycles.

Note that the example control and estimation routines included herein may be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It may be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An assembly, comprising:
a first motor in communication with a first shaft;
a second motor in communication with a second shaft;
a first gear set operably coupled to the first shaft;
a second gear set operably coupled to the second shaft; and
a clutch assembly selectively coupled to the first gear set and the second gear set and operably coupled to an output shaft, wherein the clutch assembly comprises a shift collar and a shift fork, the clutch assembly having a first configuration, a second configuration, and a third configuration, wherein in the first configuration the first motor and the second motor are coupled to the output shaft, in the second configuration the first motor is coupled to the output shaft, and in the third configuration the second motor is coupled to the output shaft.

2. The assembly of claim 1, wherein the output shaft is disposed through the clutch assembly, the output shaft extending beyond a first end of the clutch assembly, and the shift collar is coupled to the output shaft.

3. The assembly of claim 1, wherein the clutch assembly further comprises:
a first spring coupled to the shift collar; and
a first clutch element coupled to the first spring, the first clutch element selectively coupled to the first gear set.

4. The assembly of claim 3, wherein the clutch assembly further comprises a second spring coupled to the shift collar.

5. The assembly of claim 4, wherein the clutch assembly further comprises a second clutch element coupled to the second spring, the second clutch element selectively coupled to the second gear set.

6. The assembly of claim 3, wherein the first gear set comprises a first gear coupled to the first shaft and a second gear coupled to the first clutch element.

7. The assembly of claim 6, wherein the second gear comprises a friction surface adapted to engage the first clutch element.

8. The assembly of claim 6, wherein the second gear comprises a plurality of dog teeth adapted to engage the first clutch element.

9. The assembly of claim 6, wherein the second gear set comprises a first gear coupled to the second shaft and a second gear coupled to the second clutch element.

10. The assembly of claim 9, wherein the second gear comprises a friction surface adapted to engage the second clutch element.

11. The assembly of claim 1, wherein the shift collar couples to the output shaft through a splined interface between an inner diameter of the shift collar and an outer diameter of the output shaft.

\* \* \* \* \*